(12) United States Patent
Zhang et al.

(10) Patent No.: US 10,184,589 B2
(45) Date of Patent: Jan. 22, 2019

(54) RISER ASSEMBLY AND METHOD

(71) Applicant: GE Oil & Gas UK Limited, Nailsea, Bristol (GB)

(72) Inventors: Yanqiu Zhang, Houston, TX (US); Zhimin Tan, Katy, TX (US); Yucheng Hou, Katy, TX (US); Jiabei Yuan, Houston, TX (US)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 101 days.

(21) Appl. No.: 14/638,968

(22) Filed: Mar. 4, 2015

(65) Prior Publication Data
US 2016/0258553 A1    Sep. 8, 2016

(51) Int. Cl.
| | |
|---|---|
| *F16L 1/24* | (2006.01) |
| *F16L 1/235* | (2006.01) |
| *F16L 1/14* | (2006.01) |
| *F16L 1/20* | (2006.01) |
| *E21B 17/01* | (2006.01) |
| *F16L 1/19* | (2006.01) |
| *F16L 1/15* | (2006.01) |

(52) U.S. Cl.
CPC ............ *F16L 1/235* (2013.01); *E21B 17/012* (2013.01); *E21B 17/015* (2013.01); *F16L 1/14* (2013.01); *F16L 1/15* (2013.01); *F16L 1/19* (2013.01); *F16L 1/20* (2013.01); *F16L 1/24* (2013.01)

(58) Field of Classification Search
CPC .. F16L 1/24; F16L 1/20; E21B 17/015; E21B 17/012

USPC .... 405/211, 223.1, 224, 224.2, 224.3, 224.4, 405/171, 172; 166/367, 352
See application file for complete search history.

(56) References Cited

U.S. PATENT DOCUMENTS

| | | | | |
|---|---|---|---|---|
| 3,283,515 | A | * | 11/1966 | Pottorf ................ E02B 17/0004 175/7 |
| 3,461,916 | A | * | 8/1969 | Ledgerwood, Jr. ..... E21B 17/01 138/120 |
| 4,137,948 | A | * | 2/1979 | Van Heijst .............. F16L 27/02 138/120 |
| 6,062,769 | A | * | 5/2000 | Cunningham .......... E02D 27/04 166/350 |

(Continued)

FOREIGN PATENT DOCUMENTS

| | | |
|---|---|---|
| FR | 2916795 A1 | 12/2008 |
| GB | 2066191 A * | 7/1981 |

(Continued)

OTHER PUBLICATIONS

International Search Report and Written Opinion of the International Searching Authority, dated May 31, 2016, for corresponding International Application No. PCT/GB2016/050518, 13 pages.

*Primary Examiner* — Sunil Singh
(74) *Attorney, Agent, or Firm* — Klarquist Sparkman, LLP

(57) ABSTRACT

A riser assembly and method of supporting a riser assembly are disclosed. The riser assembly includes a riser; at least one buoyancy compensating element attached to the riser; and at least one damped biasing element for controlling movement of the riser about a neutral position with respect to an adjacent underwater structure. The biasing element is directly or indirectly connected to the riser and is directly or indirectly connectable to the adjacent underwater structure.

29 Claims, 10 Drawing Sheets

(56) References Cited

U.S. PATENT DOCUMENTS

| | | | |
|---|---|---|---|
| 6,461,083 B1 | 10/2002 | Pionetti et al. | |
| 7,591,316 B2 * | 9/2009 | Hatton | E21B 17/015 |
| | | | 166/350 |
| 2006/0056918 A1 | 3/2006 | Luppi | |
| 2007/0081862 A1 | 4/2007 | Wolbers et al. | |
| 2015/0060079 A1 * | 3/2015 | Clements | E21B 17/015 |
| | | | 166/350 |

FOREIGN PATENT DOCUMENTS

| | | | |
|---|---|---|---|
| GB | 2346188 | * | 8/2000 |
| JP | 62225617 a | * | 3/1987 |
| JP | 62-225617 | | 10/1987 |
| WO | WO2008/152505 A1 | | 12/2008 |
| WO | WO 2009063163 A1 | * | 5/2009 |

* cited by examiner

RISER ASSEMBLY AND METHOD

FIELD

The present invention relates to a riser assembly and method. In particular, but not exclusively, the present invention relates to a riser assembly suitable for use in the oil and gas industry, in which the position and movement of the riser in the water is controlled.

BACKGROUND

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 meters (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

Unbonded flexible pipe has been used for deep water (less than 3,300 feet (1,005.84 meters)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Also, underwater currents and turbulence can be more severe at increased depths and can cause increased movement of the riser in the water. Increased depths also increase the pressure associated with the environment in which the flexible pipe must operate. For example, a flexible pipe may be required to operate with external pressures ranging from 0.1 MPa to 30 MPa acting on the pipe.

One technique which has been attempted in the past to in some way alleviate the above-mentioned problem is the addition of buoyancy aids at predetermined locations along the length of a riser. The buoyancy aids provide an upwards lift to counteract the weight of the riser, effectively taking a portion of the weight of the riser, at various points along its length. Employment of buoyancy aids involves a relatively lower installation cost compared to some other configurations, such as a mid-water arch structure, and also allows a relatively faster installation time. Examples of known riser configurations using buoyancy aids to support the riser's middle section are shown in FIGS. 1a and 1b, which show the 'steep wave' configuration and the 'lazy wave' configuration, respectively. In these configurations, there is provided a riser assembly 200 suitable for transporting production fluid such as oil and/or gas and/or water from a subsea location to a floating facility 202 such as a platform or buoy or ship. The riser may be provided as a flexible riser, i.e. including a flexible pipe, or as a composite riser, or a metallic riser, and includes discrete buoyancy modules 204 affixed thereto. The positioning of the buoyancy modules and flexible pipe can be arranged to give a steep wave configuration $206_1$ or a lazy wave configuration $206_2$.

Wave riser configurations as shown in FIGS. 1a and 1b may also be used in shallow water applications so as to allow for excursions of the vessel from the point where the riser contacts the sea bed.

During use, a riser may be subject to dynamic loading due to conditions such as motion of a vessel or platform on the sea surface. Surge and heave motion of such surface vessel can cause curvature changes in a riser configuration. Strong currents may also have a similar effect. It is generally advantageous to prevent shape changes or control such changes within predetermined limits. The attachment of buoyancy modules, for example in a wave configuration, is one technique for creating a pre-determined nominal shape without constraining the pipe, although the effects of surface motion or current motion are still significant in the upper section of the riser and in the areas of the sag and hog bends of the wave configuration. A mid-water arch system has a comparatively higher degree of control and constraint on the pipe, as the pipe is typically clamped to a buoyancy module which has guides running across it for the pipe to lie in. However the size and weight of such mid-water arches is such that the costs of design, manufacture and installation can be very high indeed.

In addition, when a riser is located within a relatively short distance of an adjacent underwater structure (e.g. another riser extending to the same turret of a vessel), wave motion of the surface vessel and/or motion from strong currents may cause the riser to collide with the adjacent underwater structure. This can lead to damage of the flexible pipe and may also damage adjacent flexible pipes. The damage may be minor in nature but nonetheless lead to a reduced lifetime of the riser, or the damage may be more severe, requiring emergency repair work.

WO2009/063163, incorporated herein by reference, discloses a flexible pipe including weight chains secured to a number of buoyancy modules on the pipe. The chains hang from the buoyancy modules, extending downwards to the sea bed and having an end portion lying on the sea bed.

Another known arrangement employs a mid-water arch structure (as briefly mentioned above), where a riser is laid over and attached to the mid-water arch, so that the weight of the riser in the water is partially taken by the mid-water arch, reducing tension loading and degrees of freedom of the pipe. These structures tend to be difficult to install because they are secured to an anchor or gravity base on the seabed in a specific location, and also very expensive to install.

It would be useful to provide an improvement or an alternative to the above-mentioned arrangements.

SUMMARY

According to a first aspect of the present invention there is provided a riser assembly for transporting fluids from a subsea location comprising:
 a riser;
 at least one buoyancy compensating element attached to the riser; and
 at least one damped biasing element for controlling movement of the riser about a neutral position with respect to an adjacent underwater structure;
 wherein the biasing element is directly or indirectly connected to the riser and is directly or indirectly connectable to the adjacent underwater structure.

According to a second aspect of the present invention there is provided an assembly comprising a first riser assembly for transporting fluids from a subsea location and an adjacent underwater structure, the riser assembly comprising:

a riser;

at least one buoyancy compensating element attached to the riser; and at least one damped biasing element for controlling movement of the riser about a neutral position with respect to an adjacent underwater structure;

wherein the biasing element is directly or indirectly connected to the riser and is directly or indirectly connected to the adjacent underwater structure.

According to a third aspect of the present invention there is provided a method of supporting a riser assembly for transporting fluids from a subsea location, the method comprising:

providing a riser;

connecting at least one buoyancy compensating element to the riser; and providing at least one damped biasing element for controlling movement of the riser about a neutral position with respect to an adjacent underwater structure;

connecting the biasing element directly or indirectly to the riser and the adjacent underwater structure.

According to a fourth aspect of the present invention there is provided a method of restricting the extent of relative movement of adjacently arranged riser assemblies, the method comprising damping the movement of said riser assemblies with a damped biasing element extending between the respective assemblies and connected directly or indirectly thereto.

In certain embodiments the adjacent underwater structure is a further riser assembly. The further riser assembly can comprise a riser and at least one buoyancy compensating element attached to the riser.

Certain embodiments provide the advantage that a riser assembly can be provided with a predetermined and controlled shape in the water.

Certain embodiments provide the advantage that regions of a riser having the greatest curvature can be controlled to prevent overbending, which may otherwise damage the pipe structure and affect the lifetime of the pipe structure.

Certain embodiments provide the advantage that vertical movement of a riser can be controlled and/or reduced to prevent damage to the pipe structure.

Certain embodiments provide the advantage that movement of the riser can be controlled and/or reduced to prevent contact or interaction with adjacent underwater structures.

Certain embodiments provide the advantage that a riser assembly and method of supporting a riser can be provided for use in water with relatively strong current and/or wave movement (for example deep or ultra-deep water) with reduced chance of damage to the flexible pipe structure, controlling the pipe configuration form but not constraining the pipe significantly.

Certain embodiments provide the advantage that a riser assembly can be provided at relatively low cost compared to some other known arrangements.

BRIEF DESCRIPTION OF THE DRAWINGS

Embodiments of the invention are further described hereinafter with reference to the accompanying drawings, in which:

FIG. 4a illustrates a riser assembly;

FIG. 4b illustrates an enlarged view of a portion of the riser assembly shown in FIG. 4a;

In the drawings like reference numerals refer to like parts.

DETAILED DESCRIPTION

Figure 1A:
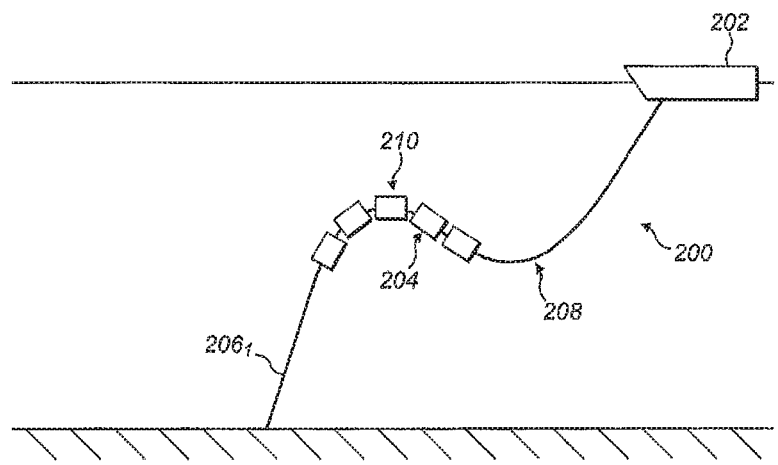
FIG. 1a illustrates a known riser assembly.
Figure 1B:
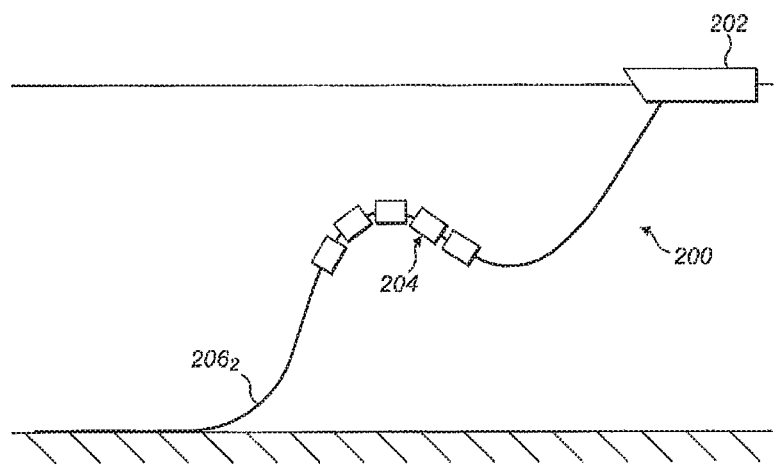
FIG. 1b illustrates another known riser assembly.
Figure 2:
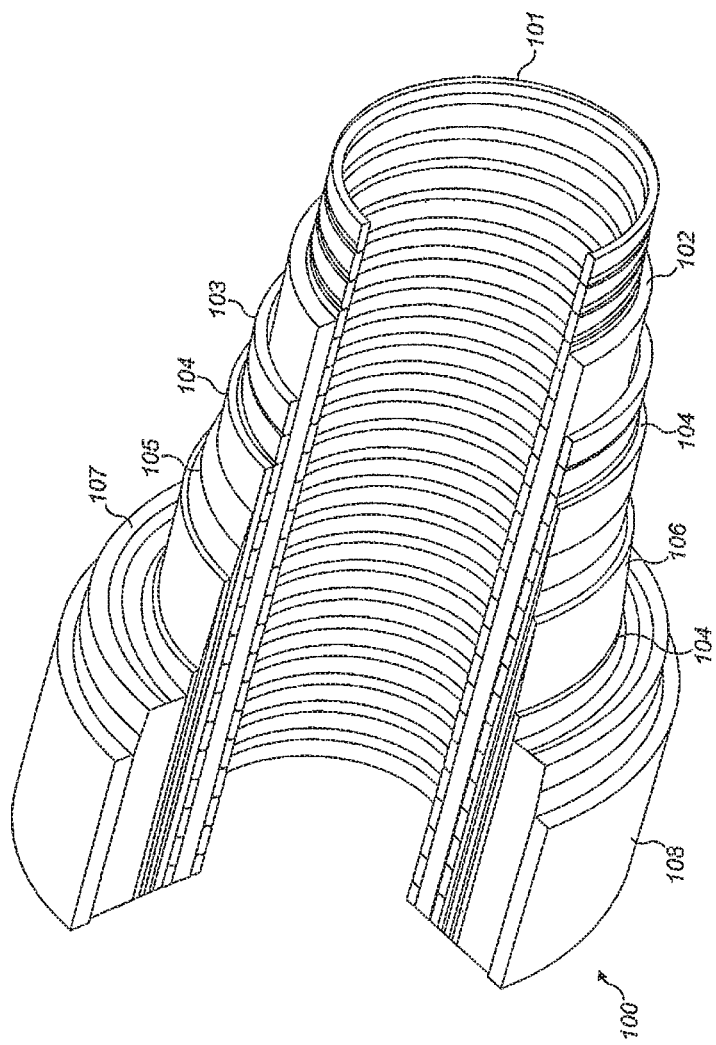
FIG. 2 illustrates a flexible pipe body.

Throughout this description, reference will be made to a flexible pipe. It will be understood that a flexible pipe is an assembly of a portion of a pipe body and one or more end fittings in each of which a respective end of the pipe body is terminated. FIG. 2 illustrates how pipe body 100 is formed from a combination of layered materials that form a pressure-containing conduit. Although a number of particular layers are illustrated in FIG. 2, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. It will also be understood that the present invention is also broadly applicable to umbilical lines comprising multiple fluid tubes and control cables in a broadly cylindrical arrangement. As used herein, the term "composite" is used to broadly refer to a material that is formed from two or more different materials, for example a material formed from a matrix material and reinforcement fibres.

As illustrated in FIG. 2, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. the tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 2 are terminated in the end fitting in such a way as to transfer the load between the flexible pipe and the connector.

Figure 3:
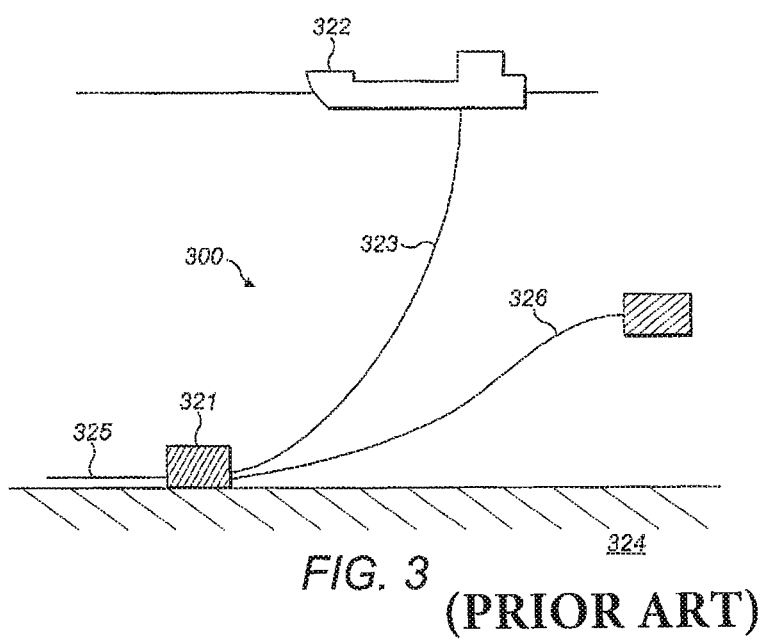
FIG. 3 illustrates another riser assembly.

FIG. 3 illustrates a riser assembly 300 suitable for transporting production fluid such as oil and/or gas and/or water from a sub-sea location 321 to a floating facility 322. For example, in FIG. 3 the sub-sea location 321 includes a sub-sea flow line. The flexible flow line 325 comprises a flexible pipe, wholly or in part, resting on the sea floor 324 or buried below the sea floor and used in a static application. The floating facility may be provided by a platform and/or buoy or, as illustrated in FIG. 3, a ship. The riser assembly 300 is provided as a flexible riser, that is to say a flexible pipe 323 connecting the ship to the sea floor installation. The flexible pipe may be in segments of flexible pipe body with connecting end fittings. FIG. 3 also illustrates how portions of flexible pipe can be utilised as a flow line 325 or jumper 326.

It will be appreciated that there are different types of riser, as is well-known by those skilled in the art. Embodiments of the present invention may be used with any type of riser, such as a freely suspended (free, catenary riser), a riser restrained to some extent, totally restrained riser or enclosed in a tube (I or J tubes).

Figures 4A, 4B:
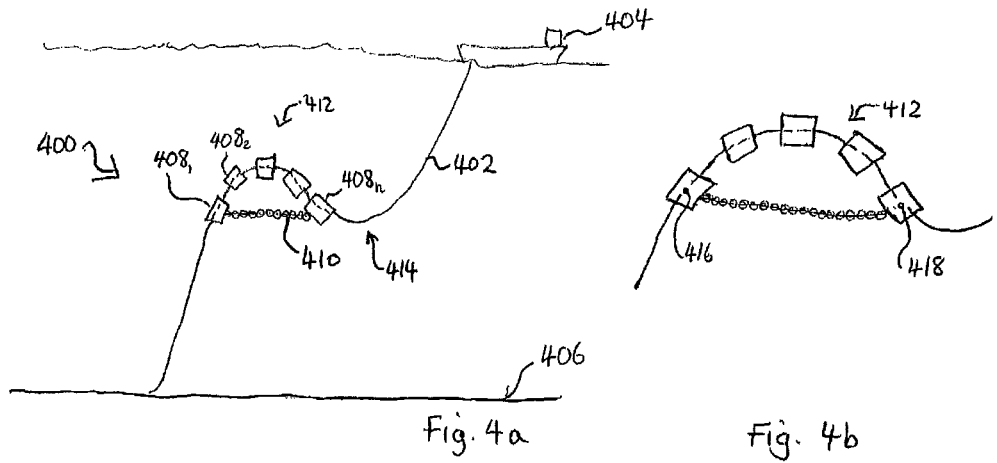

The present disclosure concerns embodiments of a riser assembly and methods for supporting a flexible pipe. FIGS. 4a and 4b illustrate a riser assembly according to one embodiment. The riser assembly 400 includes a riser 402, extending from a location at the seabed 406 to a floating vessel 404. The riser itself may be a flexible pipe, for example as described above, and therefore for brevity will not be described in further detail.

The riser assembly 400 also includes at least one buoyancy compensating element $408_{1-n}$ attached to the riser for providing positive or negative buoyancy to the riser. It will be understood that a buoyancy compensating element may either provide positive buoyancy to the riser (e.g. a buoyancy aid or buoyancy module), or provide negative buoyancy to the riser (e.g. a ballast weight), or the buoyancy compensating element may be neutrally buoyant.

In this case the buoyancy compensating element is a buoyancy module providing upward lift to the riser, for supporting a section of the riser. By use of the buoyancy modules 408, the riser lies in the water in a 'wave' configuration. Although five buoyancy modules 408 are shown in FIGS. 4a and 4b as an example, it will be appreciated that any number of buoyancy modules, or buoyancy compensating elements, may be used depending on the specific requirements and circumstances of use.

The riser assembly 400 also includes a tethering element 410, which in this case is a length of metal chain 410. The chain ties a first buoyancy module to a further buoyancy module, so as to urge the riser into a bend configuration.

In this embodiment the tethering element 410 has a length shorter than the length of flexible pipe between the points of tying, so as to create the formation of a hog bend. Aptly the tethering element 410 has a length at least 5% shorter than the length of flexible pipe between the points of tying.

The chain connects a first point 416 of the riser (i.e. a first specific location along the riser) with a further point 418 of the riser (i.e. a further specific location along the riser) so as to form the hog bend 412 in the riser (as shown in FIG. 4b). In this case the chain connects the first and further points 416, 418 of the riser via buoyancy modules.

Alternatively the chain may connect the first and further points of the riser via elements securing the buoyancy modules to the pipe. As can be seen in the figure, formation of a hog bend 412 also leads to the formation of a sag bend 414.

In this embodiment a metal connector ring (not shown) is applied to each of the first buoyancy module and the further buoyancy module. The connector ring (or alternatively two or more rings) acts to attach to the buoyancy module, and create an attachment point for the chain to be connected to. The connector ring helps to achieve easy connection of tethering element to the riser, and thus easy installation of the riser assembly. Alternatively, a clamp or other connecting device may be used, or the chain may be affixed directly to the buoyancy module or flexible pipe (without a connecting device).

In use, a riser or flexible pipe may be supported in the water in a configuration such as that exemplified in FIG. 4a, by providing a riser; providing at least one buoyancy compensating element attached to the riser for providing positive, negative or neutral buoyancy to the riser; and providing at least one tethering element for joining a first point of the riser to a further point of the riser so as to form a hog bend or a sag bend in the riser.

In use, when the riser is in a standard configuration (i.e. is not subject to rough seas etc.) the at least one tethering element is generally in a taught configuration joining a first point of the riser to a further part of the riser so as to maintain the riser in a wave configuration. In other words, the tethering element will generally be in tension. Of course, adverse conditions, for example rough seas or strong underwater currents, may cause the riser to adopt a wave configuration having a smaller radius of curvature. In this case the tethering element may become temporarily slackened. When normal conditions are resumed the tethering element will become taught again and will maintain the riser in the desired wave configuration.

For example, the riser can be paid out from a vessel, with the at least one buoyancy compensating element being attached to the riser at a predetermined location as the riser is paid out. Aptly the buoyancy compensating element(s) may have a connector ring also attached at the time of being attached to the riser. Once the riser is located in the water, the tethering element 410 can be attached to the buoyancy modules so as to achieve the final riser shape. Alternatively, the necessary elements of the riser assembly may be provided in the factory at the stage of manufacture at the factory, or at the time of deployment of the riser, or a combination thereof.

It will be appreciated that the specific dimensions of the riser, the shape it assumes in the water, the buoyancy of the buoyancy modules, and the dimensions of the tethering element, etc., may be predetermined in accordance with the specific requirements for the particular use of the riser assembly.

The tethering element helps to control and support the shape of the riser in the water, to help prevent unwanted movement of the riser after installation. In particular, the tethering element helps to prevent or reduce unwanted vertical movement of the riser caused by wave motion of the surface vessel or platform and/or motion from strong currents.

It will be appreciated that the tethering element may be made from chain, wire or fibre rope, strip(s) of tensionable material, bar or such like, suitable to apply the tension required between the first and further riser locations in order to create the desired shape in the flexible pipe.

Alternatively or additionally to the configuration described above, the riser assembly may include a tethering element, e.g. a length of metal chain, to attach a first point on the riser to a further point on the riser, so as to urge the riser into a sag bend configuration. For example, a chain may extend from a location on the riser 402 on the hog bend (e.g. at the buoyancy module 408$_n$) to a position along the riser closer to the vessel, i.e. across the sag bend region 414.

Figure 5:
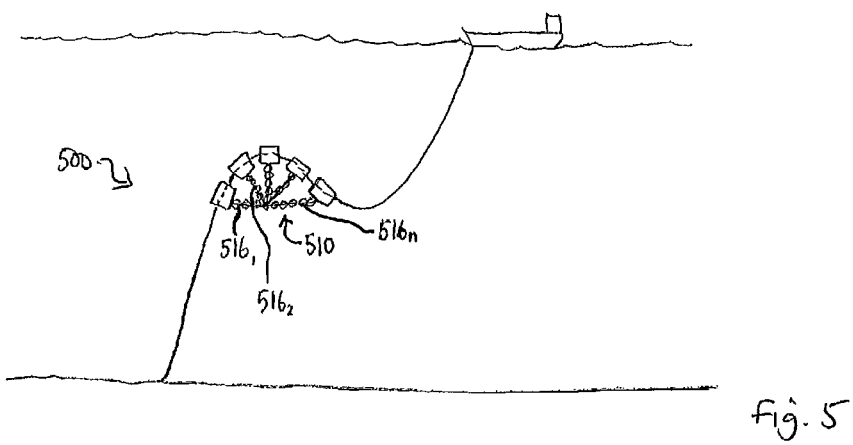
FIG. 5 illustrates another riser assembly.

FIG. 5 illustrates another riser assembly 500 according to a further embodiment. The riser assembly 500 has several elements in common with the riser assembly 400 described above, which will not be described again for brevity. However, in this case the riser assembly 500 includes a tethering element 510 that is formed of a number of sub-elements.

Specifically, the tethering element 510 includes a plurality of lengths of chain 516$_{1-n}$. The plurality of lengths of chain 516$_{1-n}$ are each connected at a common point and respectively extend to various points along the riser, in this embodiment via buoyancy modules.

The length of each sub-element chain 516$_{1-n}$ is predetermined so as to control the shape of the riser and urge the riser into a bend configuration. To help maintain the riser in the desired bend configuration, each of the plurality of lengths of chain 516$_{1-n}$ are generally in a taught configuration (i.e. in tension).

Of course it will be appreciated by those skilled in the art that each length of chain will experience a different level of tension depending on where it is connected to the riser. For example, in this embodiment the chains extending approximately horizontally will experience greater tension than the chain extending approximately vertically.

Figure 6:
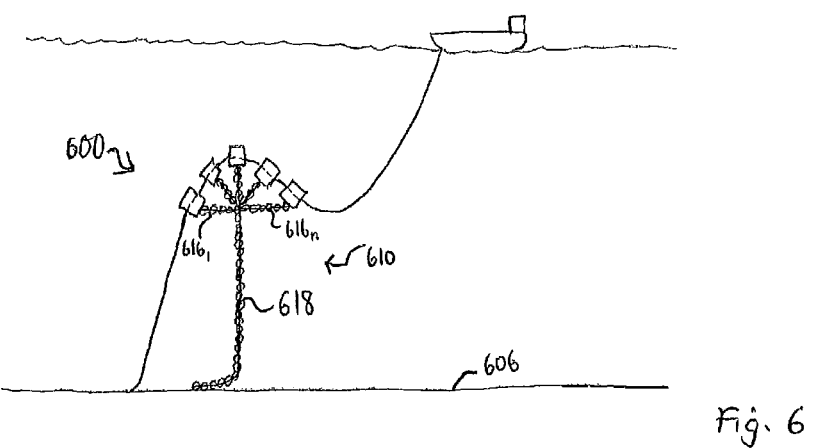
FIG. 6 illustrates another riser assembly.

FIG. 6 illustrates another riser assembly 600 according to a further embodiment. Again, the riser assembly 600 has various elements in common with the riser assembly 400 and 500 described above, which will not be described again for brevity. Here, a weight chain 618 is employed as a further sub-element of the tethering element 610. The chain 618 is secured at one end to a position on the remainder of the tethering element, in this case to the common point where lengths of chain 616$_{1-n}$ are connected (so as to spread any load relatively evenly).

The chain hangs down freely towards the sea bed 606. A remaining end of the chain 618 rests upon the sea bed 606. In this way a part of the weight chain rests on the seabed.

It will be appreciated that as conditions experienced by the flexible pipe change, such as when the density of content within the flexible pipe changes the result will be a tendency for the buoyancy modules and flexible pipe to move upwardly away from the sea bed or downwardly towards the sea bed. As such movement occurs more or less chain will rest upon the sea bed. For example, when the riser content density reduces the buoyancy will be balanced by the additional chain weight as it is lifted from the sea bed. When the riser content density increases the buoyancy will be balanced by reduced chain weight as the additional chain is laid on the sea bed. In this way the support provided to the flexible pipe is automatically and continually adjusted so as to maintain the flexible pipe in a desired configuration or at least in a configuration within predetermined threshold limits.

As an alternative to a weight chain extending down to the sea bed a top section of a weight chain may be replaced or provided by an alternative flexible filament such as a synthetic rope, wire, cable or the like. A weight chain is secured at a lower end region of the filament so that again a portion of the weight chain rests upon the sea bed.

The weight chain itself may be trimmed at the sea bed during installation to ensure that a section of the chain remains on the sea bed at the lightest riser configuration. The length of the chain on the sea bed will be determined for the largest potential change, for example in the riser contents.

During installation a length of chain is attached to each selected buoyancy module or to the flexible pipe itself as it leaves an installation deck of an installation vessel and before it reaches the surface water. The rest of the chain is then lowered into the water after it is attached to the flexible pipe or buoyancy module. The riser is then paid out continually until the next buoyancy module reaches the installation deck for weight chain attachment.

Use of the weight chain in combination with the buoyancy modules and tethering element acts as a self-adjusting device for automatically maintaining a flexible pipe configuration. Also, the weight chain acts to increase the support and control the shape of the riser in the water to help prevent unwanted movement of the riser after installation. Particularly, the weight chain helps to restrict unwanted vertical movement of the riser after installation.

Alternatively, the upper portion of the tethering element, i.e. chains 616$_{1-n}$, may be tied to a fixed structure, which may for example be a gravity base (anchor weight) located on the seabed. A tether of rope or chain for example may be used to tie the upper portion directly to the fixed structure. Such an arrangement would help prevent unwanted movement of the riser assembly by restricting the horizontal and vertical movement of the riser.

Figure 7:
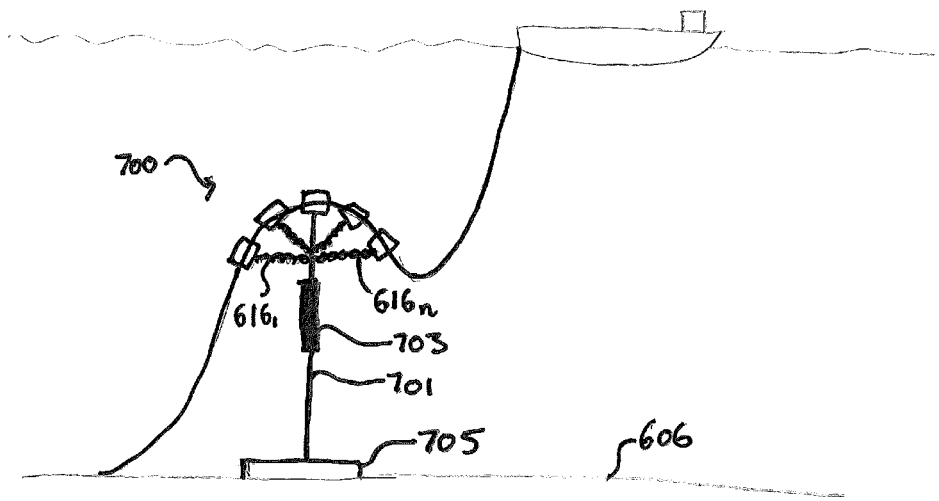
FIG. 7 illustrates another riser assembly.

FIG. 7 illustrates a further riser assembly according to another embodiment. In this embodiment the riser assembly 700 has various elements in common with the riser assembly 400, 500 and 600 described above, which will not be described again for brevity. Here the riser is tethered via a tethering element 701, which includes a damped biasing element 703. The tethering element 701 is anchored to the sea bed via a gravity base 705.

In this example the biasing element 703 can be a hydraulic cylinder. The hydraulic cylinder can control the movement of the riser upon displacement from a neutral position with respect to the sea bed. For example, when the riser is displaced vertically upwards from its neutral position, the hydraulic cylinder will act to return the riser back to the neutral position as quickly as possible without causing further riser oscillations. Preferably the hydraulic cylinder is critically damped.

The tethering element is formed from two rigid members, with the biasing element 703 connected in line in between the rigid members. The rigid members enable the biasing element to effectively control the movement of the riser in multiple directions by allowing both compression and extension of the biasing element 703 about the neutral position.

The tethering element 701 is connected to the riser via a buoyancy compensating element. In this example a metal connector ring (not shown) is applied to the buoyancy module to which the tethering element 701 is to be connected. The connector ring (or alternatively two or more rings) is attached to the buoyancy module, and creates an attachment point to which the tethering element 701 can be connected. The connector ring helps to achieve easy connection of tethering element to the riser, and thus easy installation of the riser assembly. Alternatively, a clamp or other connecting device may be used, or the tethering element 701 may be affixed directly to the buoyancy module or flexible pipe (without a connecting device). Alternatively the tethering element 701 may be connected to the riser via the chains $616_{1-n}$. The tethering element may be connected to the gravity base 705 in a similar way using connector rings, for example. Connecting the tethering element to the riser and the gravity base in this way allows the tethering element (including the biasing element 703) to articulate with respect to the riser and therefore has a certain compliance for submitting to riser shape variations.

Figure 8A:
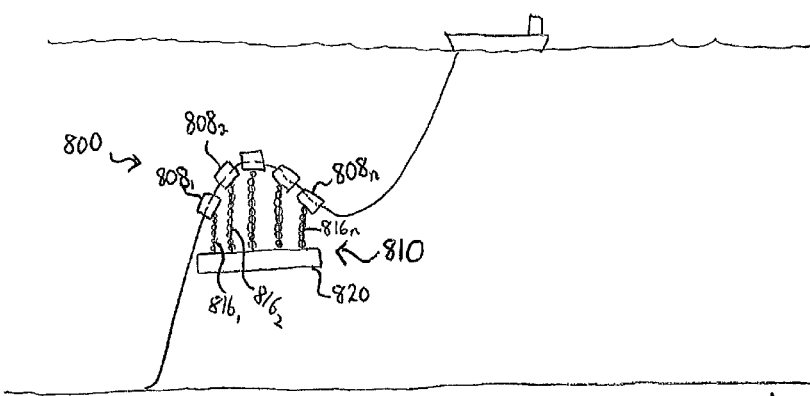
FIGS. 8a, 8b and 8c illustrate another riser assembly.
Figure 8B:
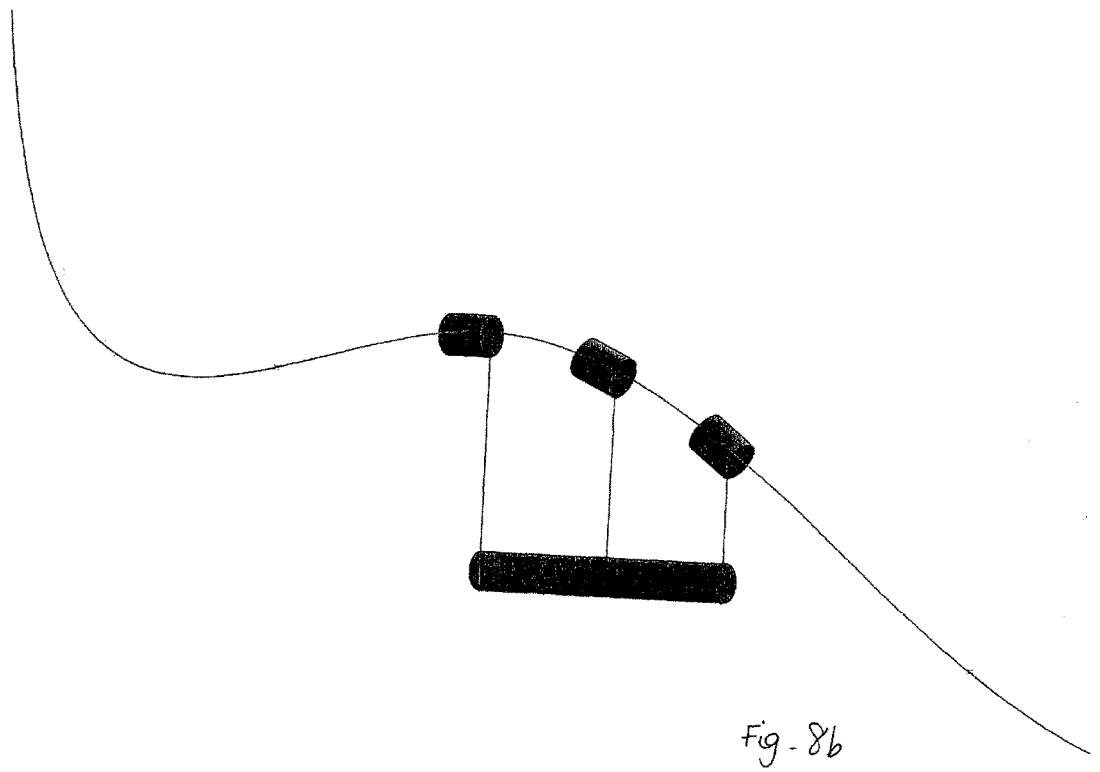

FIG. 8*a* illustrates another riser assembly 800 according to a further embodiment. Here the riser assembly includes tethering elements including chains $816_{1-n}$ and a connector element 820, which in this case is an elongate beam (spreader beam). Each chain $816_{1-n}$ is connected at one end to a respective buoyancy module $808_{1-n}$ and at its other end to the elongate beam 820. FIG. 8*b* shows a similar arrangement from a perspective view.

In this embodiment at least one connector ring (not shown) is applied to each of the buoyancy modules. The at least one connector ring acts to attach to the buoyancy module, and create an attachment point for the chain to be connected to. Alternatively, a clamp or other connecting device may be used, or the chains may be affixed directly to the buoyancy module or flexible pipe (without a connecting device).

The cylinder beam 820 in this case is negatively buoyant, i.e. acting as a ballast weight. The cylinder beam 820 therefore acts as a weighting element so as to ensure the chains $816_{1-n}$ remain taught in the water. The cylinder beam may alternatively be neutrally or positively buoyant. The cylinder beam acts as a frame such that the remaining sub elements can be affixed thereto.

The elongate beam may itself be constructed of suitable materials such as will provide the desired size shape and buoyancy. This may be determined as a fabricated steel or alloy tank filled with air (or another gas), water (or another liquid), or dense solid particles (for example sand or lead shot). Alternatively the elongate beam may include a hollow polyurethane or polypropylene chamber; alternatively a steel or alloy sub-frame with a light, thin balloon or envelope attached at various locations to secure it to the sub-frame. It will be understood that other construction materials can also be envisaged.

The shape of the elongate beam may be that of a cylinder, or barrel, or section of material of a suitable shape in order to provide sufficient stiffness through either material properties, design (second moment) or a combination of the two. The effect of different shapes of the elongate beam would likely require a change to the lengths of the chains $816_{1-n}$, minimising the risk of connecting chains to the incorrect positions on the pipe or the elongate beam.

The chains $816_{1-n}$ each have a predetermined length, which has been calculated so that the shape formed by the riser assembly is a hog bend in the water. As shown in FIG. 8*a*, the central chain has a length longer than the chains either side. The specific dimensions of the chains and number of chains can be predetermined to suit the particular application of use, including the environmental conditions and the riser shape required. Together the chains $816_{1-n}$ control the vertical movement of the riser pipe and to a lesser degree the lateral movement of the pipe, although the system as a whole is allowed to move together, within the limitations applied by the fixed ends of the pipe.

In general, in use the chains 816 will be in tension due to the weight of the elongate beam acting downwards towards the sea bed. The tension in the chains helps to urge the riser into a hog bend configuration.

Although FIG. 8*a* and FIG. 8*b* both show a hog bend, it will be appreciated that a sag bend can also be created using a elongate beam and a number of chains. The length of the chains can be adjusted accordingly to create the desired wave configuration. For example, for a weighted (negatively buoyant) elongate beam, chains connected to the outer edges of the elongate beam will need to be of longer length than those connected closer to the centre of the elongate beam in order to create a sag bend.

Similarly, for a positively buoyant elongate beam (that will naturally sit above the riser in the water), the chains connected to the outer edges of the elongate beam will need to be shorter than those connected closer to the centre of the elongate beam in order to form a sag bend. In this case the buoyancy of the elongate beam will provide an upward force acting on the chains, keeping them in tension during use and urging the riser into a sag bend configuration.

Figure 8C:
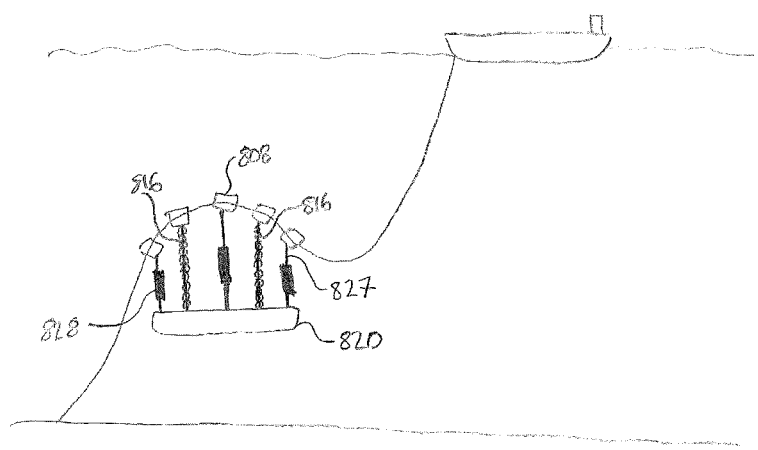

FIG. 8*c* illustrates an alternative arrangement to the riser assemblies of FIGS. 8*a* and 8*b*. In this example the elongate beam is connected to the riser via two chains 816 and three tethering elements 827. Each of the tethering elements 827 includes a damped biasing element 828. In this example the damped biasing element 828 can be a hydraulic cylinder. The hydraulic cylinder can control the movement of the riser upon displacement from a neutral position with respect to the elongate beam 820. For example, when the hog bend is compressed the central hydraulic cylinder will extend and the outermost hydraulic cylinders will compress. Each of the hydraulic cylinders will then exert a force on the riser to return the riser back to its neutral position as quickly as possible without causing further riser oscillations. Preferably the hydraulic cylinder is critically damped.

It will be appreciated that although two chains 816 and three tethering elements 827 are shown here, any number of chains (and/or wire, fibre rope, strip(s) of tensionable material, bar or such like) and/or tethering elements may be used depending on specific riser requirements. For example, one or more tethering elements may be used alone or in combination with one or more chains (and/or wire, fibre rope, strip(s) of tensionable material, bar or such like).

Figure 9A:
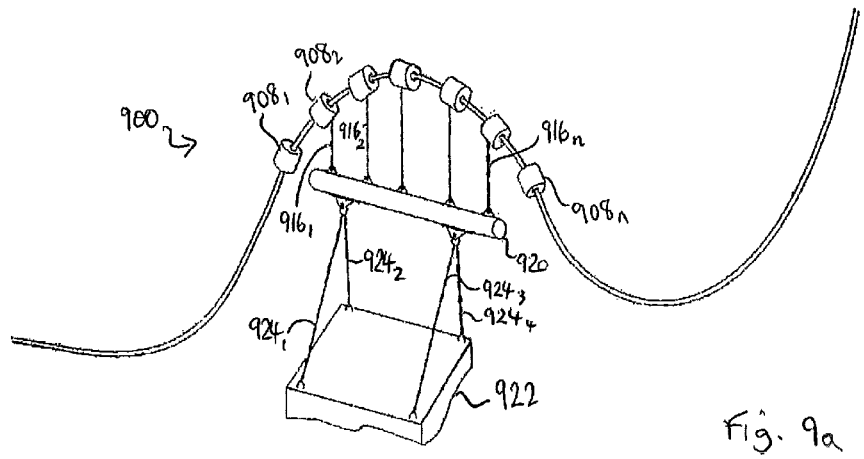
FIGS. 9a and 9b illustrates a perspective view of a yet further riser assembly.

FIG. 9a illustrates another riser assembly 900 according to a further embodiment. As can be seen in the figure, the riser assembly 900 has chains $916_{1-n}$ and an elongate beam 920 in common with the riser assembly 800 described above, which will not be described again in detail for brevity. Here, the elongate beam 920 is itself tethered to an underwater structure, in this case a heavy, concrete base 922 located on the seabed. The concrete base acts as an anchoring element.

As shown in FIG. 9a, the elongate beam 920 is tethered at two points via four ropes $924_{1-4}$ to four points on the concrete base 922, respectively. Of course other arrangements are possible. This embodiment requires that the tethering element is tied to a fixed location in the water. This helps to not only control the shape of the riser's hog bend but also control the accuracy of the position of the riser overall with respect to other fixed structures, e.g. the seabed, or other relatively fixed structures, e.g. a vessel or other risers in the water.

The elongate beam 920 is positively buoyant, though it may alternatively be negatively buoyant or neutrally buoyant. The buoyancy of the elongate beam may be predetermined in relation to the buoyancy of the riser and in relation to the contents of the riser in service (gas risers can be more positively buoyant than, for instance, a water injection riser). In some preferred arrangements, the buoyancy of the elongate beam and the net buoyancy of the riser (in combination with the buoyancy compensating elements) are selected such that the tethering elements $924_{1-4}$ remain in constant tension.

Advantageously, in a configuration where a fixed gravity base is employed such as in FIG. 9a, it may be particularly useful to use ropes or fibre tethers in place of chains for the connectors $916_{1-n}$. This provides the advantage that the natural elasticity of those types of elongate elements ensures that there is no shock loading applied to the riser pipe from movements in the pipe reaching the extremes of the length of the tethering elements. Similar benefits can be gained in other configurations detailed herein where a weight chain may also be replaced with a tether and a gravity base.

In use, the arrangement of FIG. 9a may be assembled, for example, as follows. The concrete base 922 may be positioned on the seabed and tied to the cylinder beam 920, which has a positive buoyancy. Then (or before or at the same time), the buoyancy modules $908_{1-n}$ may be mounted to the riser whilst the riser is held on a laying vessel. Then, the riser is installed into the water, if necessary (i.e. if the pipe is itself not sufficiently negatively buoyant either unfilled or filled with water), with temporary ballast material to counteract the buoyancy modules during installation. Finally, some or all of the buoyancy modules may be connected to the cylinder beam using chains 916 by divers or using a ROV (remotely operated underwater vehicle).

Figure 9B:
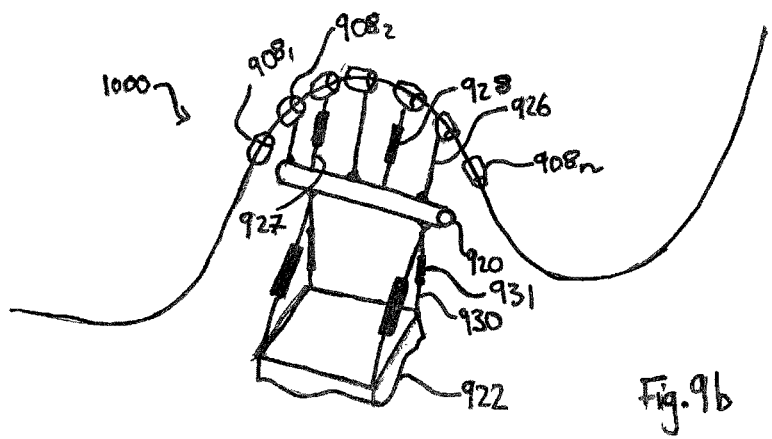

FIG. 9b illustrates another riser assembly 1000. Many elements of the riser assembly 1000 are similar to those shown in FIG. 9a and for brevity will not be described again in detail.

In this example the elongate beam 920 is connected to the riser via tethering elements 926, 927. Three tethering elements 926 are formed from chains and two tethering elements 927 each include a damped biasing element 928. The biasing element 928 in this example can be a hydraulic cylinder connected at one end to a buoyancy compensating element 908 and connected at a second end to the elongate beam 920.

The tethering elements 926, 927 are indirectly connected to the riser via buoyancy compensating elements attached to the riser. The tethering elements 926, 927 may be connected to the buoyancy compensating elements and the elongate beam 920 using connector rings (not shown) or they may be clamped together or may be directly connected.

The biasing element 928 helps to control the movement of the riser about a neutral position with respect to the elongate beam 920. For example, if the riser is deflected from the hog bend configuration shown in FIG. 9b, the biasing element will exert a force on the riser to bring it back to the neutral configuration. Preferably, the biasing element is critically damped to ensure that the riser is returned to the neutral position as quickly as possible without further oscillations. Of course, in some situations an over damped biasing element may be more appropriate if slower movement of the riser to the neutral position is required, for example to reduce excessive strain on a particular section of riser.

The elongate beam is tethered 920 to the concrete base 922 via tethering elements 930. Each of the tethering elements 930 can include a damped biasing element 931. In this example the biasing element 931 can be a hydraulic cylinder. The biasing elements 931 control the movement of the riser assembly about a neutral position with respect to the sea bed (and the concrete base 922).

In this example, the tethering element 930 includes a rigid portion either side of the biasing element. The rigid portion enables the biasing element 931 to both compress and expand in response to riser movement. The biasing element can then exert an opposite force on the riser (via the rigid portions of the tethering element 930) to return the riser to the neutral position. Alternatively, the biasing element 931 may extend the whole of the length between the elongate beam 920 and the concrete base 922 without the need for rigid portions either side, Although in the example described above, the elongate beam is connected to the riser via five tethering elements, any number of tethering elements (with or without a biasing element) may be selected depending on the requirements of a specific riser. That is, the elongate beam may be connected to the riser via two or more tethering elements. One or more of the tethering elements may include a biasing element, or in some situations, biasing elements may not be required.

In another alternative arrangement, the elongate beam 920 may be connected to the concrete base 922 via one or more tethering elements. One or more of these tethering elements may include a biasing element. Aptly, at least the elongate beam 920 is connected to the concrete base 922 via two or more tethering elements.

In use, the arrangement of FIG. 9b may be assembled, for example, as follows. The concrete base 922 may be positioned on the seabed and the tethering elements 930 (including biasing elements 931) connected between the concrete base and the elongate beam 920, which has positive buoyancy. Then (or before or at the same time), the buoyancy modules $908_{1-n}$ may be mounted to the riser whilst the riser is held on a laying vessel. Then, the riser is installed into the water, if necessary (i.e. if the pipe is itself not sufficiently negatively buoyant either un-filled or filled with water), with temporary ballast material to counteract the buoyancy modules during installation. Finally, some or all of the buoyancy modules may be connected to the elongate beam using tethering elements (some of which may include biasing elements) by divers or using a ROV (remotely operated underwater vehicle).

Figure 10:
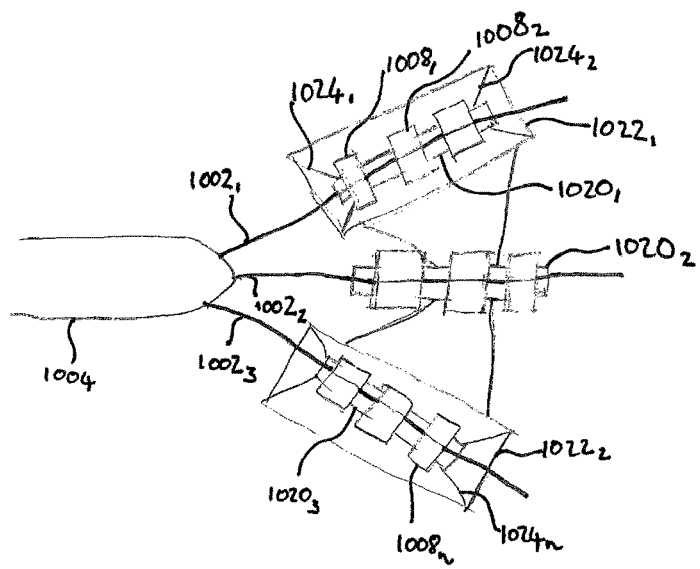
FIG. 10 illustrates a plan view of an arrangement of riser assemblies.
Figure 11:
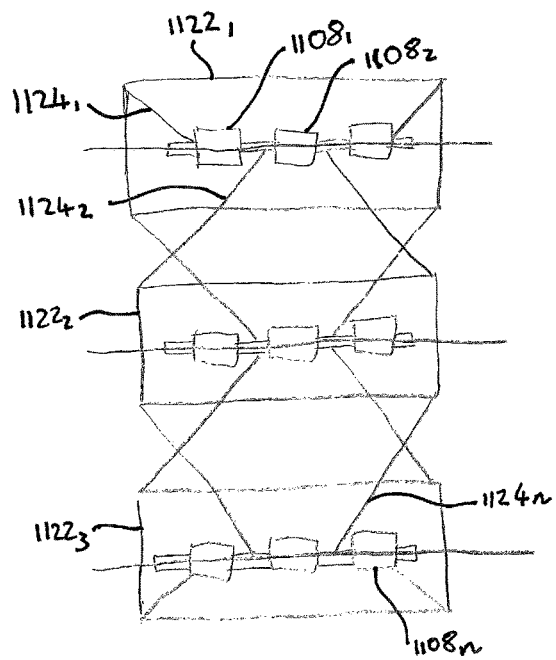
FIG. 11 illustrates another plan view of another arrangement of riser assemblies.

FIGS. 10 and 11 show a plan view of other variations to the embodiment of FIG. 9a. FIG. 10 illustrates risers $1002_{1-3}$ with buoyancy modules $1008_{1-n}$ extending from a vessel 1004 comprising a turret, to which the risers are connected. As is shown, each riser may be equipped with its own chain and elongate beam 1020 configuration, but the elongate beams $1020_{1-3}$ are tied at different angles to two anchoring elements $1022_{1,2}$. The cross-tethering of the cylinder beams may help to strengthen the structure of the overall arrangement. As an alternative to cross-tethers, rigid cross connecting elements may be used directly between cylinder beams, or even directly between the risers themselves using additional or common connection points on buoyancy or clamps. The rigid connecting elements may be bars or tubes of metal or other suitable material but may also possess significant degrees of freedom of movement with respect to the risers at the respective connection points through the use or flexible or universal jointing systems, but be able to maintain a desired separation between adjacent risers due to their rigidity.

Also through the use of these cross tethers or cross connecting elements it may be possible to reduce the number or size of the cylinder beams or anchoring elements $1022_{1,2}$.

Significantly as a result of this embodiment the degree of lateral motion of the three risers shown is controlled so that there is little or no risk of clashing of the risers in extremes of weather and sea-states.

FIG. 11 is similar to FIG. 10, showing three risers with buoyancy modules $1108_{1-n}$ and corresponding cylinder beams $1120_{1-3}$ with cross-tethering of cylinder beams to anchoring elements $1122_{1,2}$ via ropes $1124_{1-n}$. In this case the risers are installed almost parallel as if hanging from the side of a platform or vessel.

The cylinder beam configurations may alternatively include a more complex framework of connecting elements for forming more complex structures to hold flexible pipes in a desired configuration.

Figure 12:
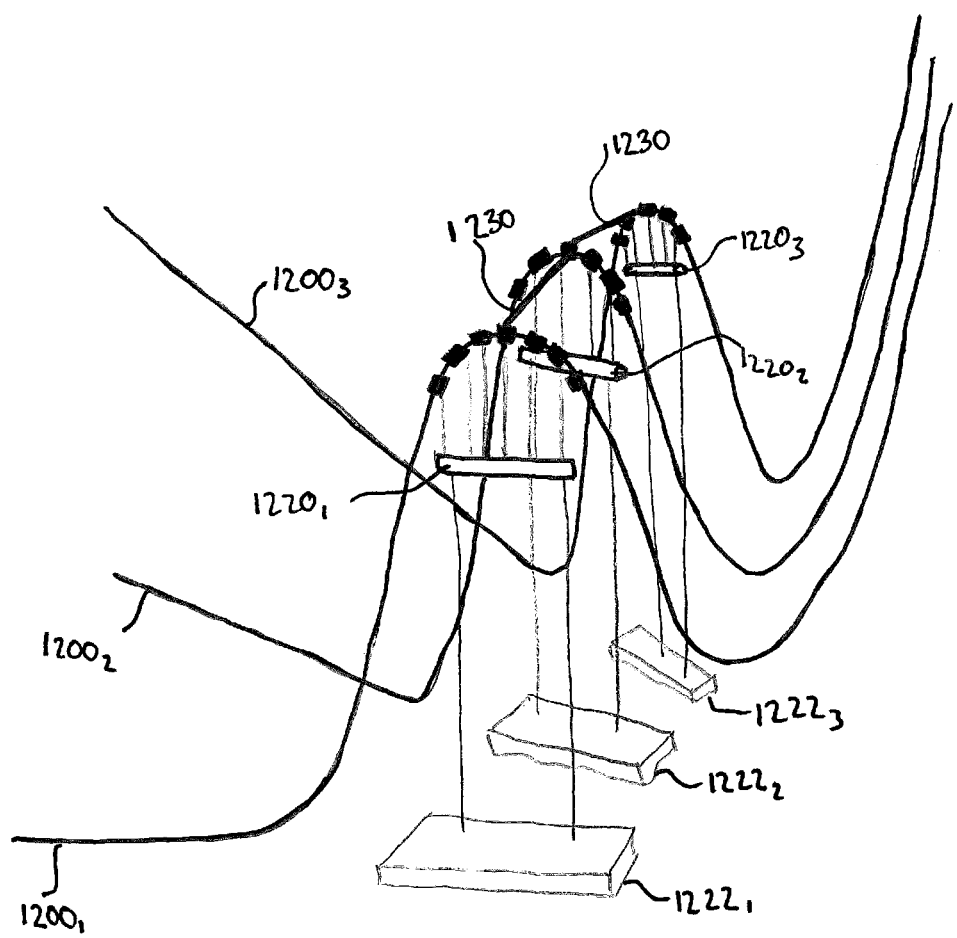
FIG. 12 illustrates a perspective view of another arrangement of riser assemblies.

FIG. 12 illustrates a perspective view of three adjacent riser assemblies each including a respective riser $1200_{1-3}$. In this example, each of the riser assemblies includes an elongate beam arrangement similar to that described above in relation to FIG. 9a. Each of the risers 1200 are connected to a respective elongate beam $1220_{1-3}$, via two or more tethering elements. The elongate beam 1220 is tethered to a respective anchoring element $1222_{1-3}$ on the sea bed, via two tethering elements.

A damped biasing element 1230 is connected between adjacent riser assemblies. In this example the biasing element 1230 is connected indirectly to the each of the riser assemblies via a buoyancy compensating element attached to the riser. In alternative arrangements, the biasing element 1230 may be connected directly to the respective risers 1200.

The biasing element 1230 can be a hydraulic cylinder extending between the risers 1200. The biasing element 1230 controls and damps the relative movement of each of the riser assemblies about a neutral position. For example, if adjacent risers 1200 move closer together, the biasing element will compress and therefore exert an outward force on each of the riser assemblies to move them back to their neutral position with respect to each other. In some preferred arrangements, the biasing element is critically damped to help reduce or prevent oscillating movement of the riser assemblies.

In alternative arrangements two or more biasing elements may be provided between adjacent riser assemblies at different points along the riser. Providing more biasing elements at different points along the riser can help control the position and relative movement of the risers over a longer section, which may be necessary in more extreme conditions.

In some preferred arrangements the biasing elements are connected to each of the risers in a manner that allows the biasing element to articulate with respect to the riser. For example, the biasing element may be connected to the riser or an attached buoyancy compensating element using connector rings attached to the riser or buoyancy compensating element and the biasing element. The connector rings loop together (in a similar manner to elements of a chain), and therefore allow a large degree of freedom for movement of the riser with respect to the biasing element. In this way, the horizontal spacing between adjacent risers can be controlled without restricting the relative angle of the biasing element with respect to each riser, and therefore allowing for riser shape variation.

Of course, a damped biasing element may be provided in the manner described above between any adjacent riser configurations. For example, a damped biasing element may be provided between two adjacent riser assemblies having configurations similar to those shown in any of FIG. 1 or 3 to 8.

Figure 13:
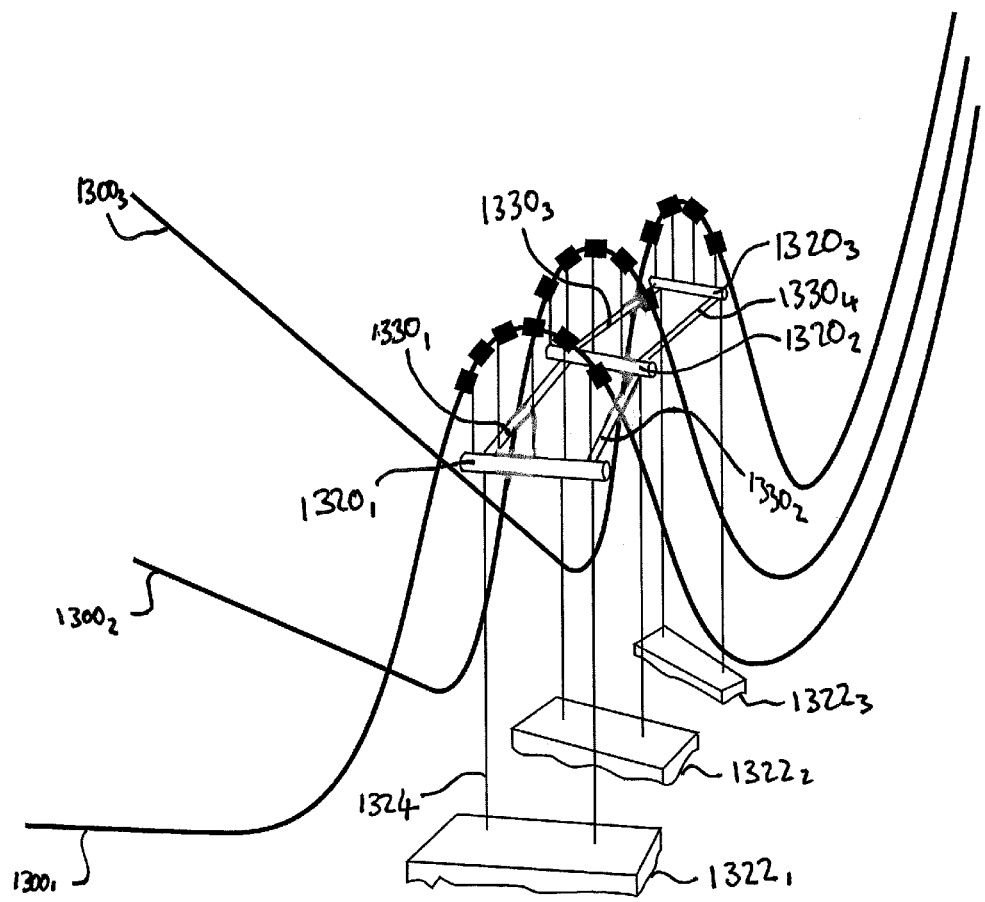
FIG. 13 illustrates a perspective view of another arrangement of riser assemblies

FIG. 13 illustrates a perspective view of another riser assembly configuration including three adjacent riser assemblies each including a respective riser $1300_{1-3}$. Again, each of the riser assemblies includes an elongate beam arrangement similar to that described above in relation to FIG. 9a. Here each elongate beam 1320 is tethered to an anchoring element 1322 via two tethering elements 1324. Here the tethering elements 1324 are formed from rope.

Each elongate beam $1320_{1-3}$ is connected to an adjacent elongate beam 1320 via a biasing element $1330_{1-4}$. In this example two biasing elements 1330 connect adjacent elongate beams 1320 together to form a frame. Each of the risers 1300 is therefore restrained by both the elongate beam 1320 and the interconnecting biasing elements 1330.

The biasing elements 1330 can each include a hydraulic cylinder that can be preferably critically damped. The relative movement and spacing between the risers 1300 is controlled by the hydraulic cylinder. Upon displacement from a neutral (equilibrium) position, the hydraulic cylinders will exert a force on each of the elongate beams to which it is connected to return the elongate beams, and the attached risers, to the neutral position.

In some preferred arrangements the elongate beams 1320 and the biasing elements 1330 are connected in a manner that allows the biasing element to articulate with respect to the riser. An example of a suitable connection between the elongate beam 1320 and the biasing element 1330 is shown in more detail in FIG. 14. Connector loops 1340 are attached to each of the elongate beam 1320 and the biasing element 1330. The connector loops 1340 are connected via a connector ring 1341, which loops through both connector loops 1340, to thereby connect the elongate beam 1320 and the biasing element 1330 together. Alternatively the connector loops 1340 may directly loop together without the need for a connector ring 1341. By having suitable connections, the frame including the biasing elements 1330 and the elongate beams 1320 can articulate to conform to variations in riser shape between each of the riser assemblies. The connector loops 1340 may be formed from steel or alloy material strong enough to withstand the stresses, or a composite material. The connector ring 1341 may be formed from aramid rope or wire rope or steel or alloy material or composite forged or formed into a shackle or other suitable connector. Alternatively the connection arrangement may be constructed directly from forged or alloy "D-shackles" 1340 without a linking element 1341 at all.

Figure 14:
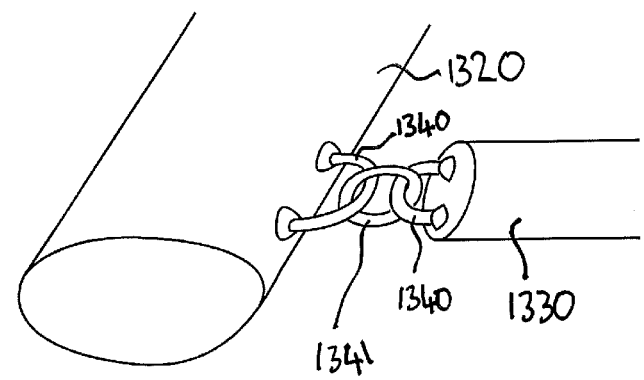
FIG. 14 illustrates a connection between elements of the riser assemblies of FIG. 13.
Figure 15:
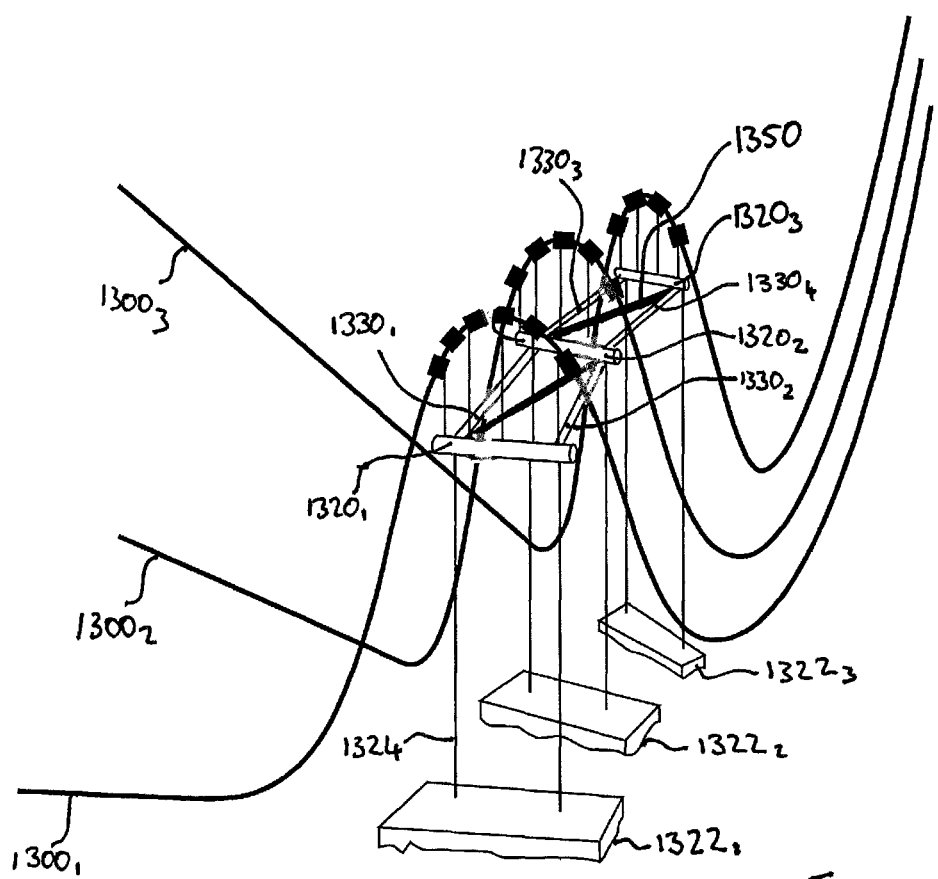
FIG. 15 illustrates a perspective view of another arrangement of riser assemblies.

FIG. 15 illustrates three adjacent riser assemblies in a similar configuration to the riser assemblies of FIG. 14. Many elements are the same as described in relation to FIG. 14 and for brevity will not be described again in detail.

In addition to the biasing elements 1330, this arrangement includes diagonal biasing elements 1350 extending between adjacent cylinder beams 1320. Each diagonal biasing element 1350 in this example can be a hydraulic cylinder. The diagonal biasing elements 1350 can provide further control over the relative movement and positioning of the riser assemblies.

In an alternative arrangement, diagonal biasing elements 1350 may be provided instead of biasing elements 1330 (i.e. biasing elements 1330 may not be required). In another alternative arrangement rigid elements may be provided in place of one or more biasing elements 1330 or diagonal biasing elements 1350.

Figure 16:
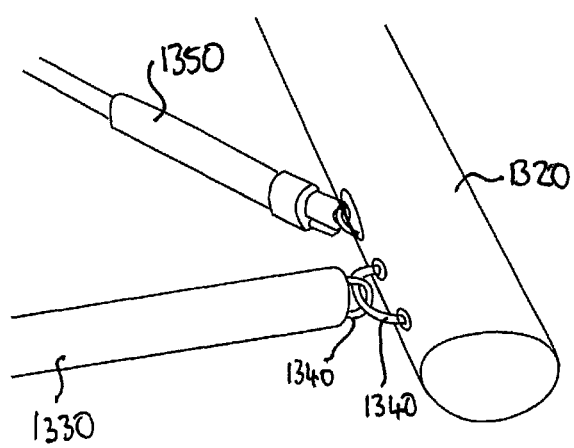
FIG. 16 illustrates a connection between elements of the riser assemblies of FIG. 15

FIG. 16 illustrates a more detailed view of an example of a connection of the diagonal biasing element 1350 and the biasing element 1330 to the elongate beam 1320. Separate connector loops 1340 are attached to the elongate beam 1320 and the biasing element 1340. The connector loop 1340 on the elongate beam 1320 loops through the connector loop 1340 on the biasing element 1330 to connect the elongate beam 1320 and the biasing element 1330 together. The diagonal biasing element 1350 is connected to the elongate beam in a similar manner. The connector loops 1340 may be formed from steel or alloy material or composite forged or formed into a shackle or other suitable connector.

In use, the arrangement of FIG. 13 or 15 may be assembled, for example, as follows. The anchoring element 1322 (concrete base, for example) may be positioned on the seabed and the tethering elements 1324 (optionally including biasing elements 931) connected between the concrete base and the elongate beam 1320, which has positive buoyancy. Then (or before or at the same time), the buoyancy modules may be mounted to the riser 1300 whilst the riser is held on a laying vessel. Then, the riser 1300 is installed into the water, if necessary (i.e. if the pipe is itself not sufficiently negatively buoyant either un-filled or filled with water), with temporary ballast material to counteract the buoyancy modules during installation. Finally, some or all of the buoyancy modules may be connected to the elongate beam using tethering elements (some of which may include biasing elements) by divers or using a winch and/or an ROV (remotely operated underwater vehicle).

Various modifications to the detailed arrangements as described above are possible. For example, where the tethering element has been described as a chain in some embodiments, the tethering element may be a rope or filament or cord, or cable, or the like, or a combination thereof. The tethering element may also include other parts in addition to the chain, rope, filament, cord, cable, etc. Aptly the tethering element is at least partly flexible. This may help the tethering element to react to various surrounding conditions, e.g. changes in the riser or movement of the surrounding water.

Aptly the tethering element 410 has a length ($L_{te}$) extending from the first point to the second point of the riser, and the riser has a length extending from the first point to the second point ($L_r$), and the length of the tethering element 410 ($L_{te}$) is shorter than the length of the riser between the first point and the second point ($L_r$).

Rather than the biasing elements and diagonal biasing elements of FIGS. 13 and 15 extending the whole of the length between the elongate beams, the biasing elements may be connected to the elongate beams via one or more rigid elements connected in line with the biasing elements.

In some riser assembly configurations the tethering elements 1324 tethering the elongate beam 1320 to an anchoring element 1322 (as shown in FIGS. 13 and 15) may not be required. In some configurations one or more tethering elements 1324 may be required. One or more of these tethering elements may include a biasing element.

Although the assemblies of FIGS. 12, 13 and 15 are described above as having three adjacent riser assemblies, any number of riser assemblies may be provided with biasing elements connected between. For example, two or more riser assemblies may be arranged having biasing elements connected therebetween.

As an alternative to the hydraulic cylinder described above in relation to FIGS. 7 to 16, the damped biasing element may be a shock absorber, a damped coil spring, a pneumatic cylinder or an oleo strut type system. Preferably the biasing element is critically damped to efficiently return the riser to the neutral position without further oscillations. Alternatively, in some situations an over damped biasing element may be more appropriate if slower movement of the riser to the neutral position is required, for example to reduce excessive strain on a particular section of riser.

Although the buoyancy compensating elements described above have been usually described as positively buoyant, they could also be negatively buoyant, e.g. ballast weight, for use in risers that require the addition of negative buoyancy. Alternatively a combination of both buoyancy modules and ballast modules may be used.

The number of buoyancy compensating elements could be any number, depending on the specific requirements of the particular use. The buoyancy compensating elements may be attached to or integrated with the flexible pipe or riser.

Although the above arrangements have been described with a riser extending between a floating facility (vessel) and the sea bed, the riser could alternatively extend between fixed or floating platforms or other structures at different heights above or below sea level.

With the above-described arrangement a riser assembly may be provided with a predetermined and controlled shape in the water. Also, regions of a riser having a relatively high curvature can have the shape controlled to prevent overbending of the riser.

Enhanced support may be provided to the riser assembly, which leads to improved riser performance.

The riser assembly may provide the same precision shaping and control to a pipe as a known mid-water arch structure, but without the associated high costs.

A riser assembly may be provided for use in water with relatively strong current and/or wave movement with reduced chance of damage to the flexible pipe structure. For example, where two or more risers are positioned in relatively close proximity, wave action and/or currents may otherwise cause the risers to clash together. This is often possible, particularly in shallower waters or even deep waters. This may be particularly so because, in these types of waters, a hog bend/sag bend combination is frequently used to give the riser the flexibility to adapt to movement of the surface vessel (because the sag bend effectively allows some slack or a margin of error in the position of the riser relative to the vessel). The corresponding hog bend may then induce a relatively large lateral drag force, particularly with a large number, or a large cross sectional area, of buoyancy compensating elements. The riser assemblies described herein help to prevent such movement, and clashing with adjacent structures and the related damage, because of the superior control over the shape of the riser and position in the water.

With one or more biasing elements connected to the riser and an adjacent underwater structure (e.g. an adjacent riser, the seabed or another portion of the riser assembly), the degree of movement and the position of the riser can be controlled in relation to the adjacent underwater structure. In particular the damped biasing element helps to prevent or eliminate oscillating motion of the riser about a neutral position.

With the tethering elements that extend to a fixed location, e.g. the seabed (or platform or other fixed structure), a more precise control over the riser shape and location in the water can be achieved compared to known arrangements.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A riser assembly for transporting fluids from a subsea location to a floating facility comprising:
    a first riser;
    at least one buoyancy compensating element attached to the first riser; and
    at least one damped biasing element for controlling movement of the first riser about a neutral position with respect to an adjacent second riser extending alongside and spaced laterally from the first riser such that the at least one damped biasing element controls lateral spacing between the first and second risers;
    the at least one damped biasing element directly or indirectly connected to the first riser and directly or indirectly connectable to the second riser,
    wherein the riser assembly further comprises an elongate beam connected to the first riser via two or more tethering elements.

2. A riser assembly as claimed in claim 1 wherein the at least one damped biasing element is critically damped.

3. A riser assembly as claimed in claim 1 wherein the at least one damped biasing element is connected to the first riser in a manner that allows the at least one damped biasing element to articulate with respect to the first riser.

4. A riser assembly as claimed in claim 1 wherein the at least one damped biasing element is connected to the first riser via the at least one buoyancy compensating element.

5. A riser assembly as claimed in claim 1 wherein the at least one buoyancy compensating element is configured to form a hog bend or a sag bend in the first riser.

6. A riser assembly as claimed in claim 1 wherein the at least one damped biasing element is indirectly connected to the first riser via the elongate beam.

7. A riser assembly as claimed in claim 1 wherein the elongate beam is in use connected via at least one further tethering element to an anchoring element on the seabed.

8. A riser assembly as claimed in claim 1 wherein the at least one damped biasing element comprises a shock absorber or a damped coil spring or a hydraulic cylinder or a pneumatic cylinder, or an oleo strut system.

9. A riser assembly as claimed in claim 1 wherein the lateral spacing between the first and second risers extends in a direction transverse to the lengths of the risers.

10. An assembly for transporting fluids from a subsea location to a floating facility, the assembly comprising:
    a first riser defining a first fluid flow path to the floating facility;
    a second riser defining a second fluid flow path to the floating facility;
    at least one buoyancy compensating element attached to the first riser;
    at least one buoyancy compensating element attached to the second riser; and
    at least one damped biasing element for controlling movement of the first riser about a neutral position with respect to the second riser;
    wherein the at least one damped biasing element is directly or indirectly connected to the first riser and is directly or indirectly connected to the adjacent second riser,
    wherein the assembly further comprises a first elongate beam connected to the first riser via two or more tethering elements and a second elongate beam connected to the second riser via two or more tethering elements.

11. An assembly claimed in claim 10 wherein the at least one damped biasing element is critically damped.

12. An assembly as claimed in claim 10 wherein the at least one damped biasing element is connected to both the first riser and the second riser in a manner that allows the at least one damped biasing element to articulate with respect to the first riser and the second riser.

13. An assembly as claimed in claim 10 wherein the at least one damped biasing element is connected to the first riser via the at least one buoyancy compensating element attached to the first riser.

14. An assembly as claimed in claim 10 wherein the at least one buoyancy compensating element is configured to form a hog bend or a sag bend in the first riser.

15. An assembly as claimed in claim 10 wherein the at least one damped biasing element has a first end connected to the first elongate beam and a second end connected to the second elongate beam.

16. An assembly as claimed in claim 10 wherein the first elongate beam is in use connected via at least one further tethering element to an anchoring element on the seabed.

17. An assembly as claimed in claim 10 wherein the at least one damped biasing element comprises a shock absorber or a damped coil spring or a hydraulic cylinder or a pneumatic cylinder, or an oleo strut system.

18. An assembly as claimed in claim 10, wherein both the first and second risers are connected to a turret of the floating facility.

19. An assembly as claimed in claim 18, wherein the first and second risers are not serially connected to each other.

20. A method of supporting a riser assembly for transporting fluids from a subsea location to a floating facility, the method comprising:
providing a first riser;
connecting at least one buoyancy compensating element to the first riser; and
providing at least one damped biasing element for controlling movement of the riser about a neutral position with respect to a second riser extending alongside and spaced laterally from the first riser;
connecting the at least one damped biasing element directly or indirectly to the first riser and to the second riser so that the at least one damped biasing element controls lateral spacing between the first and second risers;
wherein the method further comprises connecting an elongate beam to the first riser via two or more tethering elements.

21. A method as claimed in claim 20 wherein the at least one damped biasing element is critically damped.

22. A method as claimed in claim 20 wherein the at least one damped biasing element is connected to the first riser in a manner that allows the at least one damped biasing element to articulate with respect to the first riser.

23. A method as claimed in claim 20 wherein the at least one damped biasing element is connected to the first riser via the at least one buoyancy compensating element.

24. A method as claimed in claim 20 wherein the at least one buoyancy compensating element is configured to form a hog bend or a sag bend in the first riser.

25. A method as claimed in claim 20
wherein the method further comprises connecting at least one buoyancy compensating element to the second riser, wherein the at least one damped biasing element is connected to the second riser via the at least one buoyancy compensating element connected to the second riser; or
wherein the method further comprises connecting an elongate beam to the second riser via two or more tethering elements, wherein the at least one damped biasing element is connected to the second riser via the elongate beam.

26. A method as claimed in claim 20 wherein the at least one damped biasing element is indirectly connected to first riser via the elongate beam.

27. A method as claimed in claim 20 wherein the elongate beam is in use connected via at least one further tethering element to an anchoring element on the seabed.

28. A method as claimed in claim 20 wherein the at least one damped biasing element comprises a shock absorber or a damped coil spring or a hydraulic cylinder or a pneumatic cylinder, or an oleo strut system.

29. A method of restricting the extent of relative movement of adjacently arranged, laterally spaced riser assemblies, the method comprising damping the movement of said riser assemblies with a damped biasing element extending laterally between the respective assemblies and connected directly or indirectly thereto, and an elongate beam connected to a first riser via two or more tethering elements.

* * * * *